United States Patent
Zvibel

(12)
(10) Patent No.: US 8,352,835 B2
(45) Date of Patent: Jan. 8, 2013

(54) DATA VERIFICATION USING CHECKSUM SIDEFILE

(75) Inventor: Liran Zvibel, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 799 days.

(21) Appl. No.: 12/481,953

(22) Filed: Jun. 10, 2009

(65) Prior Publication Data

US 2010/0318887 A1    Dec. 16, 2010

(51) Int. Cl.
   *G11C 29/00*    (2006.01)
(52) U.S. Cl. ......... 714/773; 714/768; 714/758; 714/723
(58) Field of Classification Search .......... 714/773, 714/768, 763, 758, 723, 718
   See application file for complete search history.

(56) References Cited

U.S. PATENT DOCUMENTS

| | | | |
|---|---|---|---|
| 6,510,488 B2 | 1/2003 | Lasser | |
| 6,711,168 B1 | 3/2004 | Yoshizawa et al. | |
| 6,754,870 B2 | 6/2004 | Yoshida et al. | |
| 6,868,517 B1 | 3/2005 | Feng et al. | |
| 7,093,139 B2 | 8/2006 | Silverbrook et al. | |
| 7,395,496 B2 * | 7/2008 | Peretz et al. | 714/807 |
| 7,526,686 B2 * | 4/2009 | Kolvick et al. | 714/54 |
| 7,761,657 B2 * | 7/2010 | Nakajima | 711/112 |
| 7,859,910 B2 * | 12/2010 | Shiga | 365/185.24 |
| 2002/0138804 A1 | 9/2002 | Sangha et al. | |
| 2003/0028723 A1 | 2/2003 | Segev et al. | |
| 2004/0243885 A1 | 12/2004 | James et al. | |
| 2007/0220402 A1 | 9/2007 | Hagi et al. | |
| 2007/0226588 A1 | 9/2007 | Lee et al. | |

FOREIGN PATENT DOCUMENTS

| | | |
|---|---|---|
| JP | 2005085121 A2 | 3/2005 |
| JP | 2002185438 A2 | 6/2007 |
| WO | 9937030 | 7/1999 |
| WO | 2004086648 A1 | 10/2004 |

OTHER PUBLICATIONS

International Search Report for counterpart Application No. PCT/EP2010/057904, mailed Jul. 30, 2010.

* cited by examiner

*Primary Examiner* — Fritz Alphonse
(74) *Attorney, Agent, or Firm* — Griffiths & Seaton PLLC

(57) ABSTRACT

Exemplary method, system, and computer program product embodiments for data verification in a storage system are provided. A read of data is asynchronously submitted to nonvolatile storage media. A read of a first checksum signature is submitted to a solid state, sidefile memory location of a storage controller in the storage subsystem. The first checksum signature is representative of the data previously written to the nonvolatile storage media. A second checksum signature is calculated from the read of the data. The first and second checksum signatures are compared. If a match is not determined, a critical event is reported.

25 Claims, 5 Drawing Sheets

DATA VERIFICATION USING CHECKSUM SIDEFILE

BACKGROUND OF THE INVENTION

1. Field of the Invention

The present invention relates in general to computers, and more particularly to a method, system, and computer program product for facilitating data verification using a checksum in conjunction with a sidefile in data processing computer storage subsystems.

2. Description of the Related Art

A checksum or has sum is a fixed-size datum computed from an arbitrary block of digital data for the purpose of detecting accidental errors that may have been introduced during its transmission or storage. The integrity of the data may be checked at any time by recomputing the checksum and comparing it with the stored checksum. If the checksums do not match, the data is determined to be altered.

In data processing computer storage subsystems, a storage controller often computes a checksum signature such as a Cyclic Redundancy Check (CRC). A CRC is an error-detecting code. Its computation resembles a long division operation in which the quotient is discarded and the remainder becomes the result, with the important distinction that the arithmetic used is the carry-less arithmetic of a finite field. The length of the remainder is always less than or equal to the length of the divisor, which therefore determines how long the result can be. The definition of a particular CRC specifies the divisor to be used, among other things.

SUMMARY OF THE INVENTION

Storage controllers typically place checksum signatures such as CRCs near the stored data, for example on the same nonvolatile storage media as the stored data. As a result, if the data becomes corrupted, the error may not be detectable by the CRC. For example, situations may arise where a write of data and/or the corresponding CRC does not occur (the data is not written). In such a case, the next read of this data will read the old data and/or the old CRC, and the system may determine that the old data and/or CRC is valid. In view of the foregoing, a need exists for a mechanism whereby checksum signatures such as CRCs may be retained, yet in a storage location apart from the stored data.

Accordingly, various exemplary method, system, and computer program product embodiments for data verification in a storage subsystem are provided. In one such exemplary embodiment, by way of example only, a read of data is asynchronously submitted to nonvolatile storage media. A read of a first checksum signature is submitted to a solid state, sidefile memory location of a storage controller in the storage subsystem. The first checksum signature is representative of the data previously written to the nonvolatile storage media. A second checksum signature is calculated from the read of the data. The first and second checksum signatures are compared. If a match is not determined, a critical event is reported.

Related system and computer program product embodiments are also disclosed and provide additional advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only exemplary embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide mechanisms for data verification using a sidefile storage device as a memory location to store checksum signature information in lieu of placing the checksum signatures in close proximity to the stored data. Such a sidefile may be implemented using a small, high-performance and zero-seek time storage device, such as a solid-state drive (SSD) or flash memory device. The sidefile establishes a memory location in addition to the nonvolatile memory location in which the stored data is located. Accordingly, each checksum is recorded in the sidefile instead of being recorded on the storage controller disks. As a result, if data is never written to disk, the corresponding checksum is still written to the sidefile location. The associated error established by the stored checksum is thus ensured to be discovered.

Figure 1:
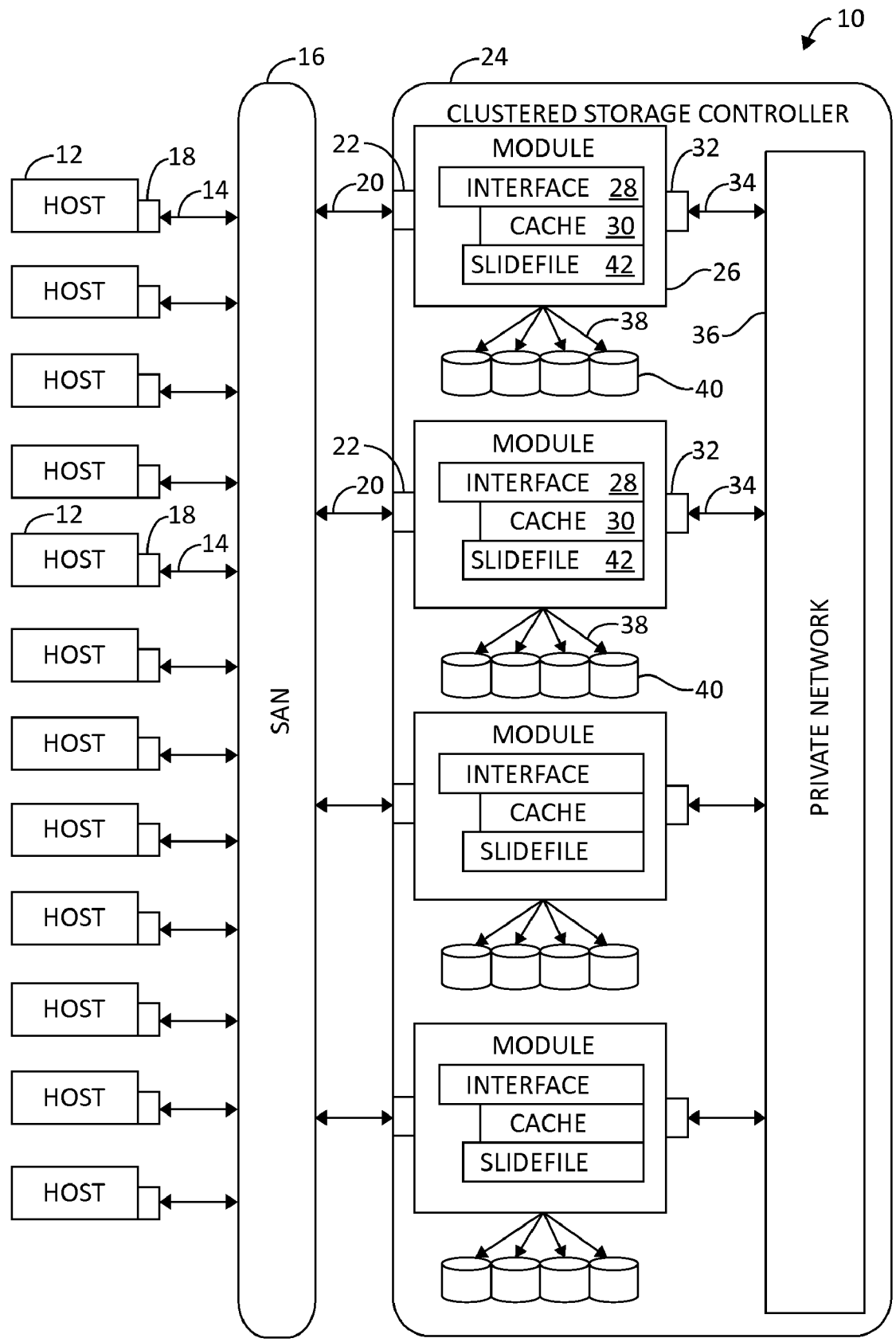
FIG. 1 is a block diagram of an exemplary computing environment including a data processing storage subsystem in which various aspects of the following description and claimed subject matter may be implemented.

Turning now to the drawings, reference is initially made to FIG. 1, which is a block diagram of an exemplary data processing storage subsystem 10, in accordance with a disclosed embodiment of the invention. The particular subsystem shown in FIG. 1 is presented to facilitate an explanation of the invention. However, as the skilled artisan will appreciate, the invention can be practiced using other storage subsystems with diverse architectures and capabilities.

The storage subsystem 10 receives, from one or more host computers 12, I/O requests, which are commands to read or write data at logical addresses on logical volumes. Any number of host computers 12 are coupled to the storage subsystem 10 by any means known in the art, for example, using a network. Herein, by way of example, the host computers 12 and the storage subsystem 10 are assumed to be coupled by a storage area network (SAN) 16 incorporating data connections 14 and host bus adapters (HBAs) 18. The logical addresses specify a range of data blocks within a logical volume, each block herein being assumed by way of example to contain 512 bytes. For example, a 10 KB data record used in a data processing application on a host computer would require 20 blocks, which the host computer might specify as being stored at a logical address comprising blocks 1000 through 1019 of a logical volume. The storage subsystem 10 typically operates in, or as, a network attached storage (NAS) or a SAN system.

The storage subsystem 10 comprises a clustered storage controller 24 coupled between the SAN 16 and a private network 36 using data connections 20 and 34, respectively, and incorporating adapters 22 and 32, again respectively. Clustered storage controller 24 implements clusters of storage modules 26, each of whom includes an interface 28 (in communication between adapters 22 and 32), and a cache 30. Each storage module 26 is responsible for a number of disks 40 by way of data connection 38 as shown.

As described previously, each storage module 26 further comprises a cache 30. However, it will be appreciated that the number of caches used in the storage subsystem 10 and in conjunction with clustered storage controller 24 may be any convenient number. While all caches 30 in the storage subsystem 10 may operate in substantially the same manner and to comprise substantially similar elements, this is not a requirement. Each of the caches 30 is typically, but not necessarily approximately equal in size and is assumed to be coupled, by way of example, in a one-to-one correspondence with a set of physical storage units, which are typically disks. In one embodiment, the disks 40 may comprise such disks. Those skilled in the art will be able to adapt the description herein to caches of different sizes, and to caches and storage devices in other correspondences, such as the many-to-many correspondence described in U.S. Patent Application Publication No. 2005/0015566, entitled "Data Allocation in a Distributed Storage System," which is assigned to the assignee of the present invention and which is incorporated herein by reference.

Each set of physical storage comprises multiple slow and/or fast access time mass storage devices, herein below assumed to be multiple hard disks. FIG. 1 shows the caches 30 coupled to respective sets of physical storage. Typically, the sets of physical storage comprise one or more disks 40, which can have different performance characteristics. In response to an I/O command, the cache 30, by way of example, may read or write data at addressable physical locations of physical storage. In the embodiment of FIG. 1, the caches 30 are shown to exercise certain control functions over the physical storage. These control functions may alternatively be realized by hardware devices such as disk controllers, which are linked to the caches 30.

In an embodiment of the present invention, the routing of logical addresses is implemented according to methods described in the above-referenced U.S. Patent Application Publication No. 2005/0015566. Routing records, indicating the association of logical addresses of logical volumes with partitions and the association of the partitions with caches, are distributed by the SAN 16 to one or more generally similar network interfaces 28 of the storage modules 26. It will be understood that the storage subsystem 10, and thereby, the clustered storage controller 24, may comprise any convenient number of network interfaces 28. Subsequent to the formation of the disks 40, the network interfaces 28 receive I/O commands from the host computers 12 specifying logical addresses of the disks 40. The network interfaces use the routing records to break the commands into I/O instructions, or command subsets, that are then distributed among the caches 30.

Each storage module 26 is operative to monitor its state, including the states of associated caches 30, and to transmit configuration information to other components of the storage subsystem 10 for example, configuration changes that result in blocking intervals, or limit the rate at which I/O requests for the sets of physical storage are accepted, as explained in further detail herein below.

Routing of commands and data from the HBAs 18 to the clustered storage controller 24 to each cache 30 is typically performed over a network and/or a switch. Herein, by way of example, the HBAs 18 may be coupled to the storage modules 26 by at least one switch (not shown) of the SAN 16 which can be of any known type having a digital cross-connect function.

In additional implementations, the HBAs 18 may be directly connected to the storage modules 26.

Data having contiguous logical addresses are generally distributed among the disks 40. This can be accomplished using the techniques disclosed in the above-referenced U.S. Patent Application Publication No. 2005/0015566. Alternatively, the data can be distributed using other algorithms, e.g., byte or block interleaving. In general, this increases bandwidth, for instance, by allowing a volume in a SAN or a file in network attached storage to be read from or written to more than one disk at a time. However, this technique requires coordination among the various disks, and in practice may require complex provisions for disk failure, and a strategy for dealing with error checking information, e.g., a technique for storing parity information relating to distributed data. Indeed, when logical unit partitions are distributed in sufficiently small granularity, data associated with a single logical unit may span all of the disks 40.

While not explicitly shown for purposes of illustrative simplicity, the skilled artisan will appreciate that in some embodiments, the clustered storage controller 24 may be adapted for implementation in conjunction with certain hardware, such as a rack mount system, a midplane, and/or a backplane. Indeed, the private network 36 in one embodiment may be implemented using a backplane. Additional hardware such as the aforementioned switches, processors, controllers, memory devices, and the like may also be incorporated into the clustered storage controller 24 and elsewhere within the storage subsystem 10, again as the skilled artisan will appreciate. Further, a variety of software components, operating systems, firmware, and the like may be integrated.

Each storage module 26 in the clustered storage controller 24 includes a sidefile 42. As previously mentioned, the sidefile 42 may include such storage devices as a solid-state drive (SSD) storage device or a flash memory device such as a Compact Flash (CF) storage device. The storage capacity of the sidefile 42 is not required to be nearly as large as that of the nonvolatile storage disks 40 as the checksums associated with stored write data are correspondingly small in comparison (typically a few bytes). As a result, a small, high-performance device may be implemented in conjunction with each storage module in a cost effective manner.

While the illustrated embodiment shows sidefiles 42 associated with each storage module 26, the skilled artisan will appreciate that other embodiments may implement sidefiles 42 in differing ways. For example, a single sidefile device may store checksum information for data stored in a number of volumes associated with a number of storage modules.

FIGS. 2A-2C, and 3, following depict exemplary methods for implementing sidefile mechanisms to improve data verification. As one skilled in the art will appreciate, various steps in the methods may be implemented in differing ways to suit a particular application. In addition, the described methods may be implemented by various means, such as hardware, software, firmware, or a combination thereof operational on or otherwise associated with the computing environment. For example, the methods may be implemented at least partially as a computer program product including a computer-readable storage medium having computer-readable program code portions stored therein. The computer-readable storage medium may include disk drives, flash memory, digital versatile disks (DVDs), compact disks (CDs), and other types of storage mediums.

Figure 2A:
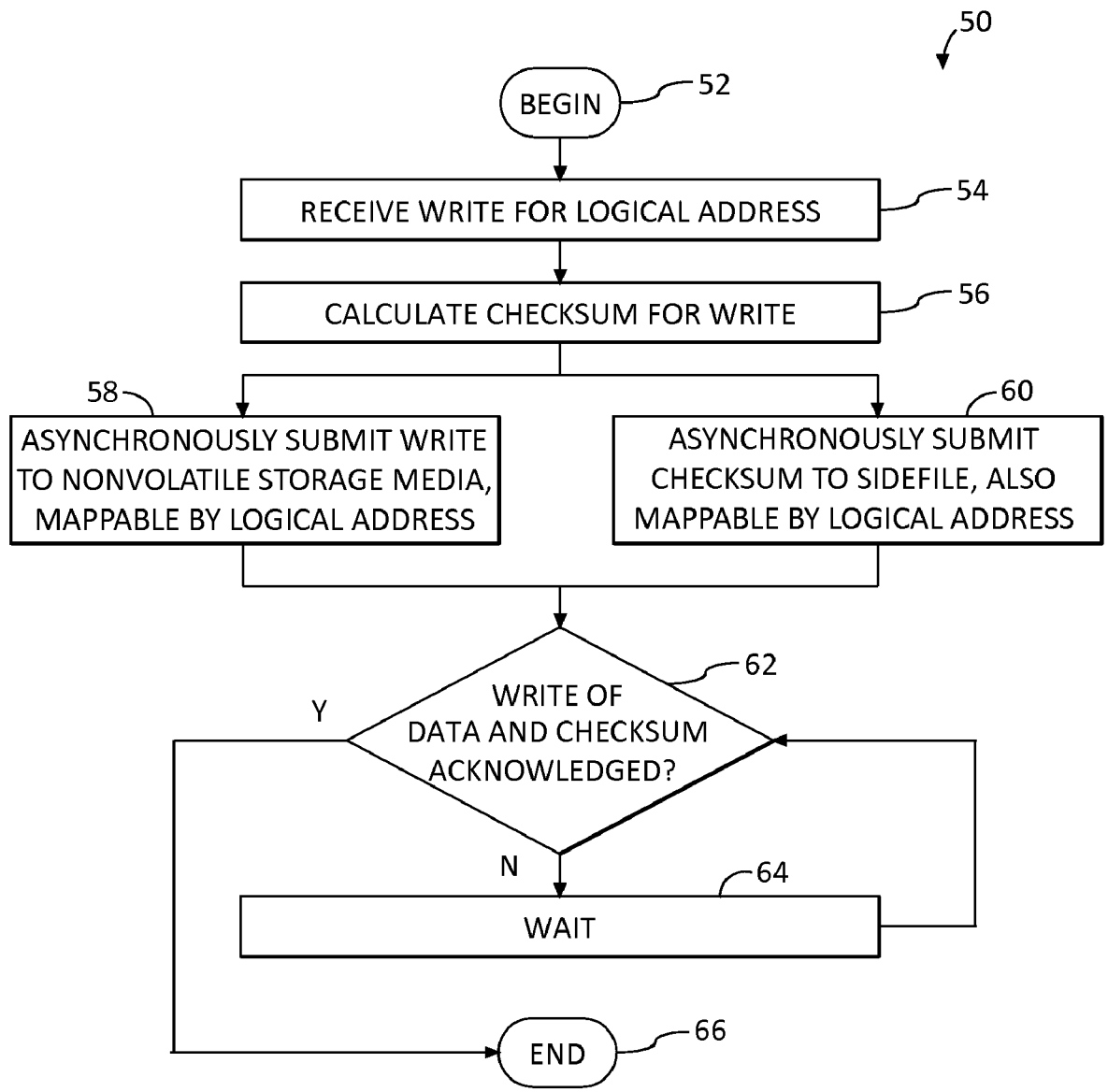
FIG. 2A is a flow chart diagram of an exemplary method for submitting a checksum signature to a sidefile.

Turning to FIG. 2A, reference is made to an exemplary method 50 for performing data writes implementing the sidefile device illustrated in FIG. 1, previously. Method 50 begins (step 52) with a write being received for a certain logical address (step 54). A checksum signature is calculated by the system for the write (step 56). The write is asynchronously submitted to nonvolatile storage media, mappable by the logical address (step 58). In addition, the checksum is asynchronously submitted to the sidefile to be recorded (step 60). Both steps 58 and 60 occur asynchronously with each other so as to allow for increased system performance. The checksum signature is also mappable by logical address. Method 50 queries whether the write of the data and the checksum signature have been acknowledged (step 62). If no, the system waits (step 64) until this is the case. The method 50 then ends (step 66).

Figure 2B:
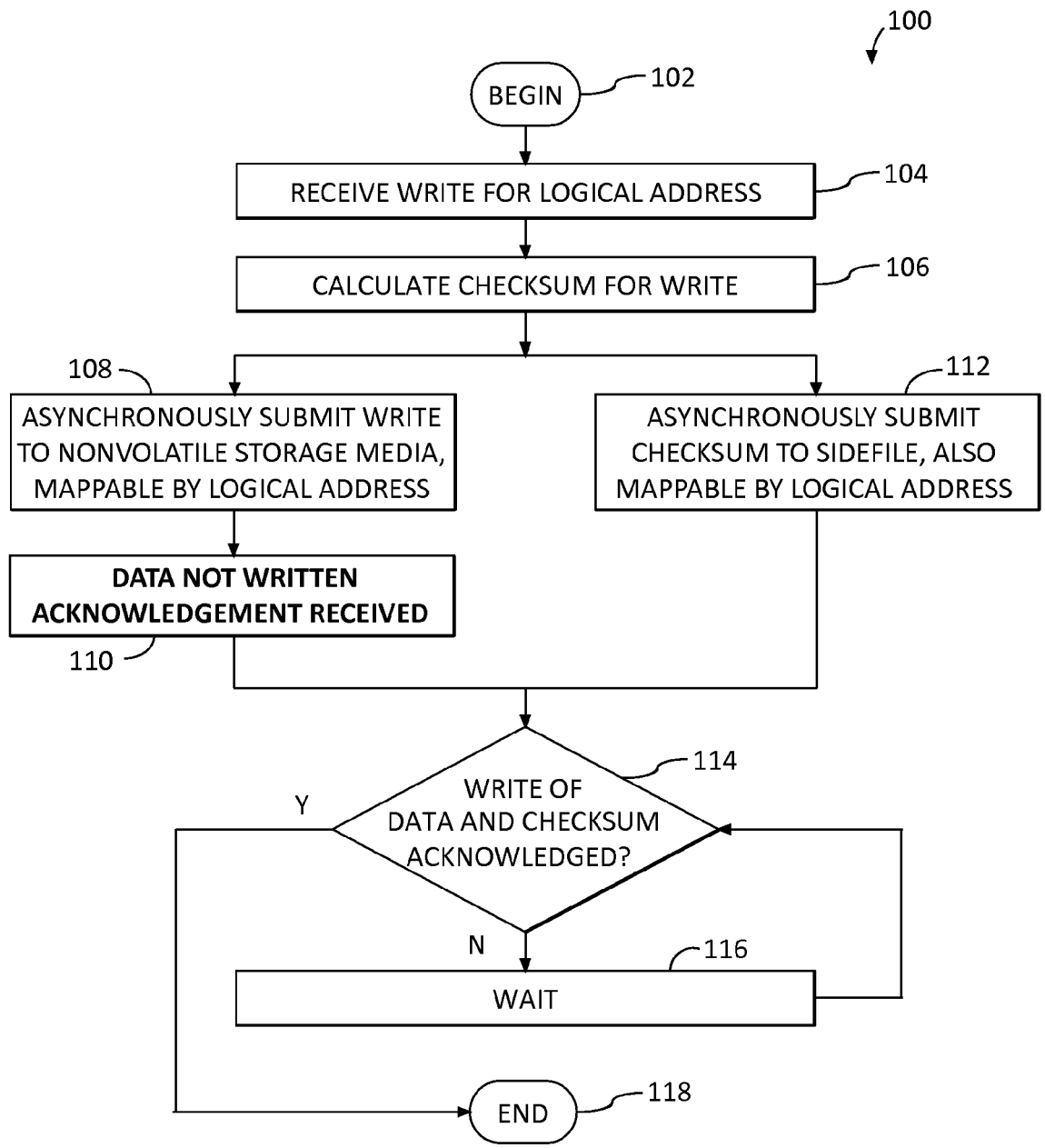
FIG. 2B is a flow chart diagram of an exemplary method of writing data wherein a data error results.
Figure 2C:
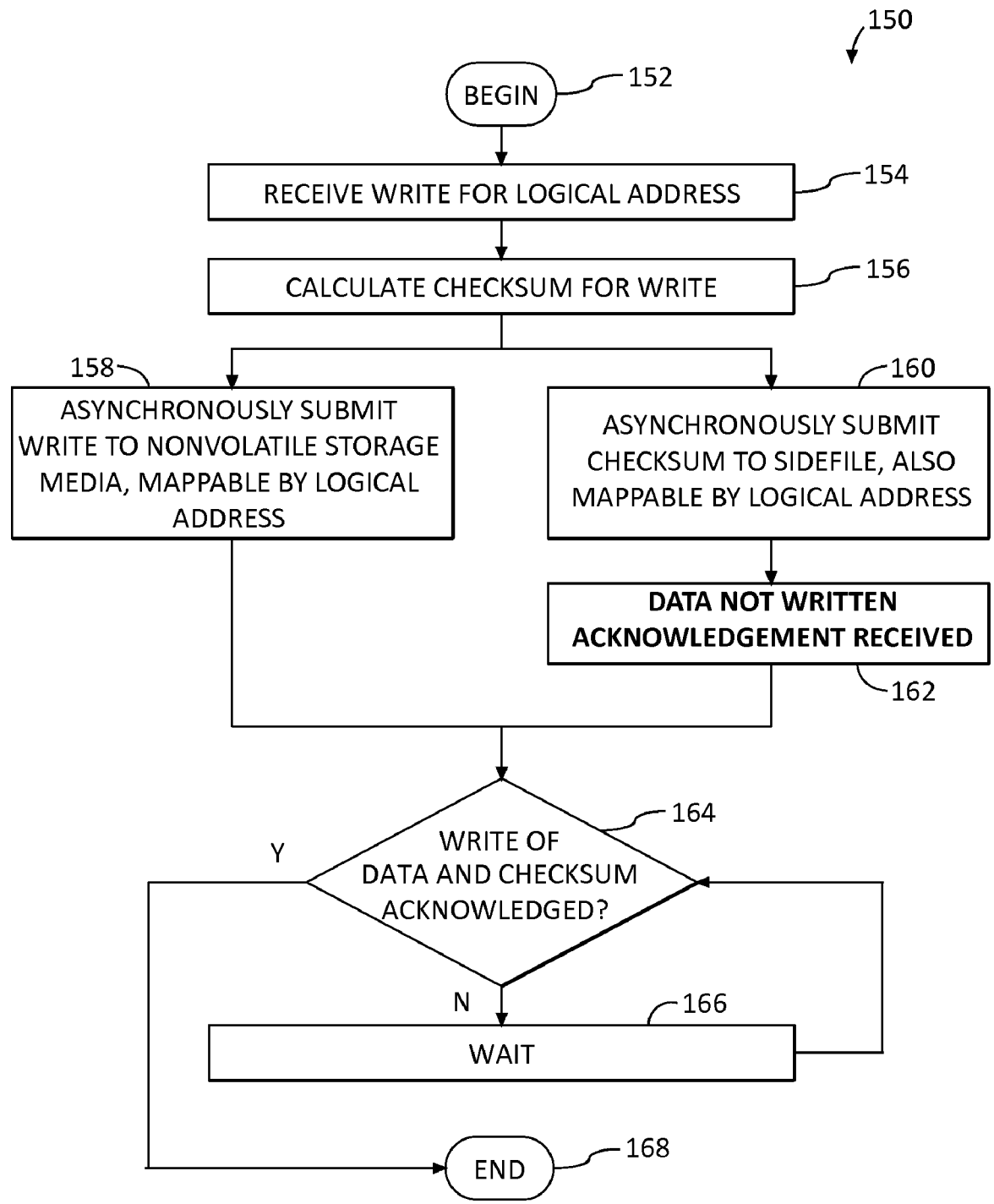
FIG. 2C is a flow chart diagram of an exemplary method of writing data wherein an additional data error results.

Turning now to FIGS. 2B and 2C, reference is made to an exemplary methods for writing data in which a data error occurs. In both exemplary methods, the data errors may be not discoverable but for the mechanisms of the present invention implementing the sidefile device previously described. Turning first to FIG. 2B, method 100 begins (step 102) with a write received for a logical address (step 104). The applicable checksum is calculated for the write (step 106), and the write is asynchronously submitted to the nonvolatile storage media, mappable by the logical address (step 108). In the present example however, the data is not written, yet an acknowledgement is received (step 110). Asynchronous with the write of the data, the checksum signature is submitted to the sidefile for storage (again mappable by the logical address) (step 112). The system waits until the writes of both data and checksum are acknowledged (steps 114, 116), and then the method 100 ends.

Turning now to FIG. 2C, method 150 begins (step 152) with a write received for a logical address (step 154). The applicable checksum is calculated for the write (step 156), and the write is asynchronously submitted to the nonvolatile storage media, mappable by the logical address (step 158). Asynchronous with the write of the data, the checksum signature is submitted to the sidefile for storage (again mappable by the logical address) (step 160). Subsequent to the submittal of the checksum signature, and in similar fashion to the previous example, the data is not written, yet an acknowledgement is received that the data was written (step 162). The system waits until the writes of both data and checksum are acknowledged (steps 164, 166), and then the method 150 ends.

Figure 3:
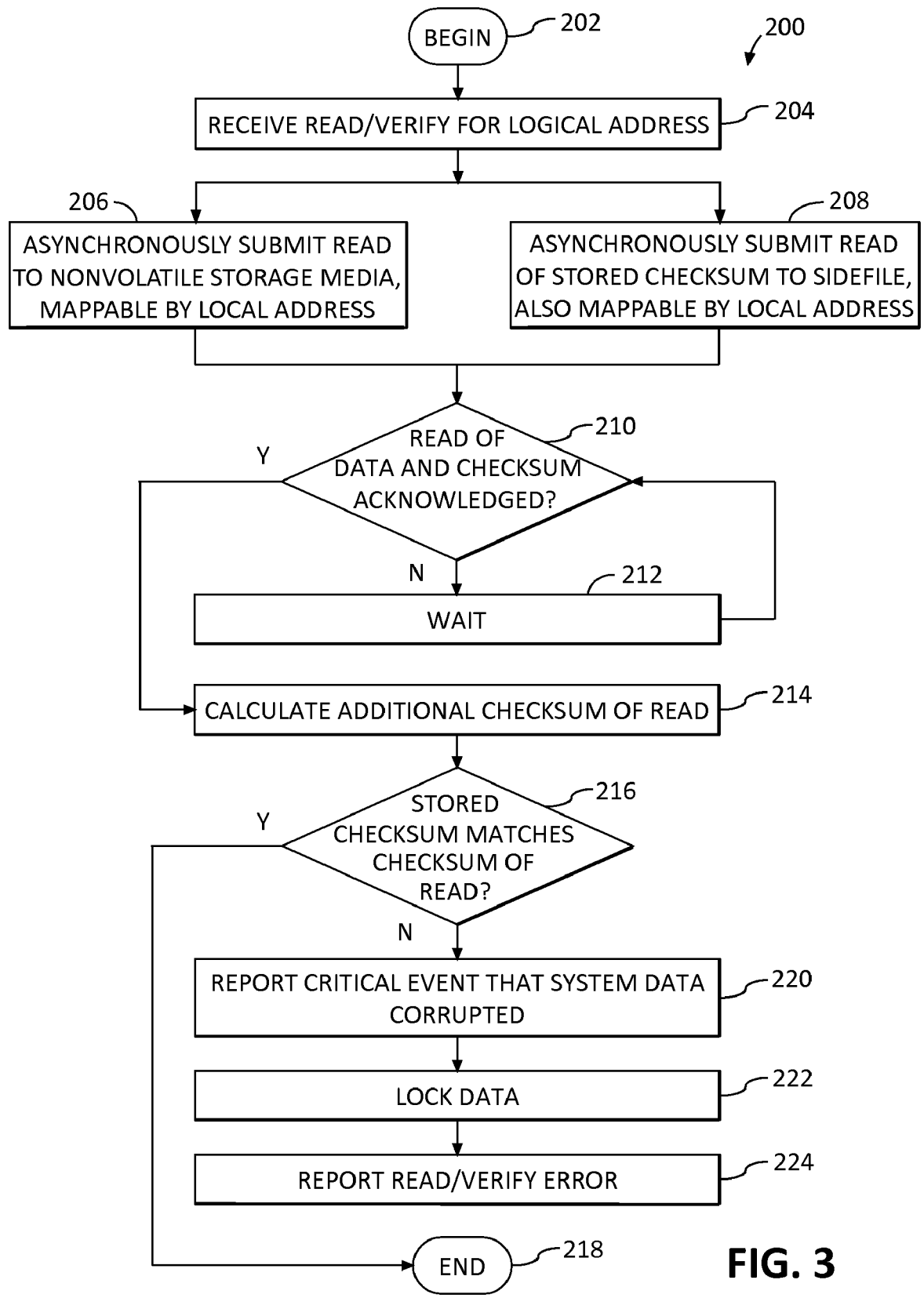
FIG. 3 is a flow chart diagram of an exemplary method for verifying data using a checksum signature submitted to a solid-state sidefile memory location according to the present invention.

Turning now to FIG. 3, an exemplary method 200 for data verification using the sidefile mechanisms previously described is now shown. Method 200 allows for the detection of data errors resulting from either of the previous examples set forth in FIGS. 2B and 2C, where write errors prevent data from being written, yet an acknowledgement is received that the data was written. Method 200 begins (step 202) with the receipt of a read/verify instruction for a logical address (step 204). The read is asynchronously submitted to the nonvolatile storage media, mappable by the logical address (step 206) while the read of the stored checksum, also mappable by the logical address, is asynchronously submitted to the sidefile location (step 208).

As a next step, the method 200 queries whether the read of data and checksum signature information is acknowledged (step 210), and waits (step 212) until this is the case. Next, an additional checksum signature is calculated for the read of data (step 214). The stored checksum is then compared against the checksum calculated for the read (step 216). If the two checksums match, then the data is verified and the method 200 ends (step 218). If not, then a critical event that system data has been corrupted is reported (step 220). The corrupted data is locked (step 222), and a read/verify error is reported (step 224). The method 200 ends (again, step 218).

Use of a sidefile location in conjunction with a storage controller to store checksum signature information provides an efficient and effective mechanism to improve data reliability in storage subsystems.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for storage for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, as electronic signals on a system or network.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for data verification in a storage subsystem by at least one processor device in communication with at least one memory device, the method comprising:

asynchronously submitting a read of data to nonvolatile storage media;

asynchronously submitting a read of a first checksum signature to a solid state, sidefile memory location of a storage controller in the storage subsystem, wherein asynchronously submitting the read of the first checksum signature to the solid state, sidefile memory location includes submitting the read to a storage module of the storage controller responsible for the nonvolatile storage media and the first checksum signature is representative of the data previously written to the nonvolatile storage media and the solid state sidefile memory location is one of an available plurality of solid state sidefile memory locations associated with each of an available plurality of storage modules in the storage controller;

calculating a second checksum signature from the read of the data; and comparing the first and second checksum signatures, wherein if a match is not determined, reporting a critical event.

2. The method of claim 1, wherein asynchronously submitting the read of the first checksum signature to the solid state, sidefile memory location includes submitting the read to at least a portion of a solid state disk (SSD) device in communication with the storage controller.

3. The method of claim 1, wherein asynchronously submitting the read of the first checksum signature to the solid state, sidefile memory location includes submitting the read to at least a portion of a flash memory device in communication with the storage controller.

4. The method of claim 1, further including, previous to asynchronously submitting the read of the data to the nonvolatile storage media:
   calculating the first checksum signature representative of the data,
   asynchronously submitting a write of the data to the nonvolatile storage media, and
   asynchronously submitting the first checksum signature to the solid state, sidefile memory location.

5. The method of claim 1, further including, previous to asynchronously submitting the read of the data to the nonvolatile storage media, receiving one of a read and a verify instruction for a logical address.

6. A computer program product for data verification in a storage subsystem by at least one processor device in communication with at least one memory device, the computer program product comprising a computer-readable storage medium having computer-readable program code portions stored therein, the computer-readable program code portions comprising:
   a first executable portion for asynchronously submitting a read of data to nonvolatile storage media;
   a second executable portion for asynchronously submitting a read of a first checksum signature to a solid state, sidefile memory location of a storage controller in the storage subsystem, wherein asynchronously submitting the read of the first checksum signature to the solid state, sidefile memory location includes submitting the read to a storage module of the storage controller responsible for the nonvolatile storage media and the first checksum signature is representative of the data previously written to the nonvolatile storage media and the solid state sidefile memory location is one of an available plurality of solid state sidefile memory locations associated with each of an available plurality of storage modules in the storage controller;
   a third executable portion for calculating a second checksum signature from the read of the data; and
   a fourth executable portion for comparing the first and second checksum signatures, wherein if a match is not determined, reporting a critical event;
   the second executable portion for asynchronously submitting the read of the first checksum signature to the solid state, sidefile memory location is further adapted for submitting the read to a storage module of the storage controller responsible for the nonvolatile storage media, wherein the solid state sidefile memory location is one of an available plurality of solid state sidefile memory locations associated with each of an available plurality of storage modules in the storage controller.

7. The computer program product of claim 6, wherein the second executable portion for asynchronously submitting the read of the first checksum signature to the solid state, sidefile memory location is further adapted for submitting the read to at least a portion of a solid state disk (SSD) device in communication with the storage controller.

8. The computer program product of claim 6, wherein the second executable portion for asynchronously submitting the read of the first checksum signature to the solid state, sidefile memory location is further adapted for submitting the read to at least a portion of a flash memory device in communication with the storage controller.

9. The computer program product of claim 6, further including a fifth executable portion for, previous to asynchronously submitting the read of the data to the nonvolatile storage media:
   calculating the first checksum signature representative of the data,
   asynchronously submitting a write of the data to the nonvolatile storage media, and
   asynchronously submitting the first checksum signature to the solid state, sidefile memory location.

10. The computer program product of claim 6, further including a fifth executable portion for, previous to asynchronously submitting the read of the data to the nonvolatile storage media, receiving one of a read and a verify instruction for a logical address.

11. A system for data verification in a storage subsystem having nonvolatile storage media, the system comprising:
   a solid state, sidefile device of a storage controller operable in the storage subsystem, the sidefile device providing a solid state, sidefile memory location in addition to the nonvolatile storage media;
   a flash memory device in communication with the storage controller and a processor device
   a storage module, operable in the storage controller, and controlled by the processor device; and
   the processor device, operable in the storage subsystem, in communication with at least one memory device and the solid state, sidefile device, wherein processor device:
      asynchronously submits a read of data to nonvolatile storage media;
      asynchronously submits a read of a first checksum signature to the solid state, sidefile memory location of a storage controller in the storage subsystem, wherein asynchronously submitting the read of the first checksum signature to the solid state, sidefile memory location includes submitting the read to the storage module of the storage controller responsible for the nonvolatile storage media and the first checksum signature is representative of the data previously written to the nonvolatile storage media and the solid state sidefile memory location is one of an available plurality of solid state sidefile memory locations associated with each of an available plurality of storage modules in the storage controller;
      calculates a second checksum signature from the read of the data; and
      compares the first and second checksum signatures, wherein if a match is not determined, reporting a critical event.

12. The system of claim 11, further including a solid state disk (SSD) device in communication with the storage controller, wherein the processor device submits the read to at least a portion of the solid state disk (SSD) device.

13. The system of claim 11, wherein the processor device:
   submits the read to at least a portion of the flash memory device in communication with the storage controller,
   calculates the first checksum signature representative of the data,
   asynchronously submits a write of the data to the nonvolatile storage media, and
   asynchronously submits the first checksum signature to the solid state, sidefile memory location.

14. The system of claim 11, wherein the storage module receives one of a read and a verify instruction for a logical address.

15. The system of claim 11, wherein the processor device maps by logical address the data written to the nonvolatile storage media and the second checksum signature calculated for the data.

16. The system of claim 11, wherein a checksum signature comprises a cyclic redundancy check (CRC).

17. The system of claim 11, wherein the sidefile device comprises one of a solid state disk (SSD) device and a flash memory device.

18. A method of manufacturing a system for data verification in a storage subsystem having nonvolatile storage media, comprising:
   providing a solid state, sidefile device of a storage controller operable in the storage subsystem, the sidefile device providing a solid state, sidefile memory location in addition to the nonvolatile storage media;
   providing a flash memory device in communication with the storage controller and a processor device
   providing a storage module, operable in the storage controller, and controlled by the processor device; and
   providing a processor device, operable in the storage subsystem, in communication with at least one memory device and the solid state, sidefile device, wherein processor device:
      asynchronously submits a read of data to nonvolatile storage media;
      asynchronously submits a read of a first checksum signature to the solid state, sidefile memory location of a storage controller in the storage subsystem, wherein asynchronously submitting the read of the first checksum signature to the solid state, sidefile memory location includes submitting the read to the storage module of the storage controller responsible for the nonvolatile storage media and the first checksum signature is representative of the data previously written to the nonvolatile storage media and the solid state sidefile memory location is one of an available plurality of solid state sidefile memory locations associated with each of an available plurality of storage modules in the storage controller;
      calculates a second checksum signature from the read of the data; and
      compares the first and second checksum signatures, wherein if a match is not determined, reporting a critical event.

19. The method of manufacture of claim 18, further including providing a solid state disk (SSD) device in communication with the storage controller, wherein the processor device submits the read to at least a portion of the solid state disk (SSD) device.

20. The method of manufacture of claim 18, wherein the processor device submits the read to at least a portion of the flash memory device in communication with the storage controller.

21. The method of manufacture of claim 18, wherein the processor device:
   calculates the first checksum signature representative of the data,
   asynchronously submits a write of the data to the nonvolatile storage media, and
   asynchronously submits the first checksum signature to the solid state, sidefile memory location.

22. The method of manufacture of claim 18, wherein the storage module receives one of a read and a verify instruction for a logical address.

23. The method of manufacture of claim 18, wherein the processor device maps by logical address the data written to the nonvolatile storage media and the second checksum signature calculated for the data.

24. The method of manufacture of claim 18, wherein the sidefile device comprises a solid state disk (SSD) device.

25. The method of manufacture of claim 18, wherein the sidefile device comprises and a flash memory device.

* * * * *